United States Patent Office

3,729,303
Patented Apr. 24, 1973

---

3,729,303
APPARATUS FOR LIQUID QUENCHING GLASS SHEETS
Joseph V. Hornyak, Lower Burrell, Pa., assignor to PPG Industries, Inc., Pittsburgh, Pa.
Filed Nov. 10, 1971, Ser. No. 197,430
Int. Cl. C03b 27/00
U.S. Cl. 65—348
9 Claims

ABSTRACT OF THE DISCLOSURE

Improved apparatus for thermally tempering glass sheets by liquid quenching comprising means adjacent a marginal edge of a glass sheet that permits unencumbered marginal edge heating in a furnace and temporarily retards the rate of cooling of at least a portion of the marginal edge when the sheet reaches the plane of the surface of the quenching liquid. This apparatus causes the body of the glass sheet between marginal edges to cool initially at a rate equal to or preferably greater than the rate at which the edges are cooled. This minimizes the tensile stresses that are temporarily established in the edge permitted to cool at an unregulated rate during liquid quenching, which tensile stresses have been associated with glass breakage during liquid quenching.

---

In a preferred embodiment, a glass sheet supporting apparatus is provided with a main member parallel to and spaced from the edge surface of the sheet which initially contacts the quenching liquid flanked by pivoting members that are wider than the spacing between the main member and the edge surface. The pivoting members occupy a position in the furnace that either enhances or does not interfere with edge heating and are pivoted into a second position by the buoyancy of the quenching liquid to temporarily divert the flow of quenching liquid away from the edge until after the liquid cools the sheet inward of said edge sufficiently to impart a compression stress to said edge before said edge contacts said quenching liquid.

BACKGROUND OF THE INVENTION

This invention is in the field of thermally tempering glass articles by liquid quenching. More particularly, this invention relates to an apparatus for thermally tempering glass articles by the dip-quenching technique.

Glass sheets are thermally tempered by heating them to an elevated temperature above the glass strain point, and then suddenly chilling the glass to cool rapidly the glass surface regions, while the interior regions of the glass cool at a slower rate. This differential cooling develops a compressive stress in the glass surface regions balanced by a tensile stress in the interior regions of the glass. The resultant tempered glass has a much greater resistance to fracture than does untempered glass. Also, in the less frequent times that tempered glass does fracture, its breakage pattern is significantly different than that of untempered glass in that tempered glass shatters into small fragments with blunt rounded edges rather than large sharp-edged pieces which result from fracturing untempered glass. This safer breakage pattern and lesser tendency to fracture gives tempered glass obvious advantages for use in such articles as transparent doors, motor vehicle closures, ophthalmic lenses and the like, where safety is an important factor.

Chilling of glass sheets can take place by impinging cool air on the surface of heated glass. This technique, although suitable for tempering thicker glass, is unfortunately not completely acceptable for tempering thinner glass. Air, because of its relatively low heat transfer coefficient, does not remove heat away from the surface of the glass quickly enough to set up a significant differential cooling pattern between the surface regions and the interior regions of the glass. Consequently, in using air to temper thin glass bodies, only relatively low degrees of temper can be obtained.

There have been suggestions in the prior art to replace air as a cooling medium and to substitute liquids. Liquids, theoretically, because of their superior heat transfer characteristics compared to air, remove heat much more rapidly from the glass surfaces than air does. This more rapid cooling produces a greater differential cooling pattern between the interior and the surfaces of the glass cooled, thus creating a potential for a higher degree of temper in the glass than possible with air tempering.

Using liquids instead of air to thermally temper glass sheets is generally referred to in the art as liquid quenching. In liquid quenching, rapid cooling of the glass is accomplished by contacting the surface of the glass with a liquid quenchant.

Contacting the surface of the glass can be accomplished by various techniques. One of these involves atomizing the quenching liquid into discrete liquid droplets and then spraying the surface of the glass. "Spray quenching" is well known in the metal tempering art and is disclosed, for example, in U.S. Pat. No. 3,208,742. Another method of contact is to immerse completely the glass sheet in the quenching liquid. This technique is referred to in the art as immersion quenching or dip quenching and is described in U.S. Pats. No. 170,339; 2,145,119; 2,198,739; 3,186,816; 3,271,207 and Belgium Pat. No. 729,055.

Although liquid quenching has been found to be moderately effective with rather thick glass sheets, it has not been very effective in tempering thinner glass specimens. Often the thinner glass fractures when the sheet is initially contacted with the quenching liquid. Most often, the fracture initiates at an edge of the sheet and continues into the body of the glass until total breakage occurs.

It is theorized that one of the more important causes of fracturing of thin glass sheets in liquid-quenching processes is the fact that the edges of the glass cool at too rapid a rate when compared with the remainder of the glass sheet. In the preferred mode of accomplishing a liquid quench by dipping a glass sheet into a liquid quenching bath, this rapid cooling of glass edges is magnified at the "leading edge" of the glass, i.e., the edge of the glass which first contacts the liquid-quenching fluid. This differential cooling is referred to as the leading edge effect. Thus, in the preferred dip-quenching method employed, this differential rate of cooling between the leading edge and the remainder of the glass sheet put the leading edge temporarily in tension to a high degree. Since glass stressed in tension is notoriously weak, it readily fractures in response to the thermal shock of dip quenching.

The leading edge cools at a greater rate than the remainder of the glass sheet because the leading edge dissipates heat by more mechanisms than does the remainder of the glass sheet. The leading edge has a greater surface area per unit volume to cool by heat exchange than the rest of the sheet. In addition, the temperature differential between the leading edge and the quenching liquid is greater than the temperature differential that exists between the other portions of the glass and the liquid, because the leading edge heats the liquid. The glass edge also dissipates heat to the liquid due to the hydrodynamic phenomena caused by liquid flow over the leading edge. This hydrodynamic flow of the quenching liquid over the leading edge as the glass sheet passes through the quenching liquid on immersion removes tremendous quantities of heat at a rapid rate from the leading edge. Thus, a situation is created where a relatively small area of the glass, that is the leading edge, is cooled at a much faster rate than is the remainder of the glass. This difference in the rate of cooling puts the leading edge in a high state of tension in which condition it is particularly susceptible to thermal shock and breakage. Such a condition is called the leading edge effect.

In accordance with this invention, apparatus is provided for use while thermally tempering glass by liquid quenching, particularly for use in the method claimed in U.S. Pat. No. 3,706,544 to Edmund R. Michalik, assigned to PPG Industries, Inc., which minimizes the problems of premature edge cooling and resultant glass fracturing. These problems have been termed the leading edge effect in the art of tempering glass by liquid quenching.

SUMMARY OF THE INVENTION

In accordance with this invention, apparatus is provided for thermally tempering glass by liquid quenching, and by dip quenching in particular, while avoiding the adverse differential cooling at the "leading" glass edge. Through the practice of this invention, the edge of the glass sheet is preliminarily strengthened before the glass sheet is subjected to liquid quenching. The preliminary strengthening of the glass edge is accomplished by providing means adjacent the glass edge, particularly the leading glass edge, that permits edge heating to proceed to a rate that is unimpaired and that retards the cooling rate at the edge when the leading edge reaches the relatively cool quenching liquid.

By temporarily retarding the rate of edge cooling initially, the present apparatus causes the body of the glass to cool at a rate at least equal to or preferably faster than the affected edge during the early portion of the cooling phase of the tempering cycle. This temporarily puts the body of the glass in tension which is balanced by the edges going temporarily into compression for sufficient time at the beginning of the cooling step to avoid edge breakage. The body of the glass is protected by the relatively strong edge stressed in compression, so glass fracture is avoided.

The apparatus of this invention is particularly useful in avoiding the leading edge effect associated with immersion (dip) quenching. For use with dip quenching the leading edge is temporarily put in compression by preliminarily cooling the body of glass behind the leading edge such that this portion of the glass cools at a rate equal to or faster than the leading edge. This temporarily puts this portion of the glass into tension while the leading edge is put into compression. The leading edge in compression can withstand a far greater thermal shock upon subsequent dip quenching that can an unstrengthened leading edge or one that is stressed in tension.

According to a specific embodiment of the invention for use in tempering glass sheets by dip quenching, means is provided for supporting a glass sheet while the latter is heated in a furnace, while the sheet is moving from the furnace to a cooling station and while the sheet is contacted with a liquid at the cooling station. The apparatus comprises a frame slightly larger than the sheet treated to encompass its edge. The frame includes baffle means and means attached to the sheet supporting apparatus for supporting the baffle means adjacent a leading edge portion of the support sheet in such a manner that at least a portion of the baffle means occupies a recessed position in the furnace and is actuated by the buoyancy of the quenching liquid to move into a closed position to the leading edge of the sheet to cause the flow of liquid to be deflected away from the leading edge of the sheet at least temporarily.

In the specific embodiment illustrated, the frame is supported in an upright position and comprises upper and lower horizontal frame members interconnected by vertical frame members. The baffle means extends closely adjacent to and parallel to the lower horizontal frame member and comprises a pair of pivoted flanking members that are pivoted near one side edge to pivot outward and downward on opposite sides of the lower horizontal frame member to the aforesaid recessed position to provide unimpeded flow of radiation from the furnace heaters to the entire supported sheet. The pivotable members are pivotable upward and inward by the buoyant force of the liquid and are at least as long as the length of the sheet along its bottom edge portion and extend upward about one inch above the bottom edge of the glass sheet. The channel-like member has two slots where the pivotable members are attached to a web member to form a leaky member encompassing the leading edge of the glass sheet in the closed position. The lower horizontal frame member is wider than the thickness of the glass and extends the entire length of the sheet to be treated in a horizontal plane spaced approximately one inch below the plane occupied by the lower edge surface of the sheet. Stop means is provided to limit the upward and inward pivotal movement of the pivoting members so that the main portion of each baffle faces the portion of the glass sheet in the closed position and other stop means controls the orientation of the pivotable members in their recessed positions. The longitudinal ends of the pivotable members are curved inward to provide flanges extending toward one another whose inner ends rest on the lower horizontal frame member when the pivotable members are in the closed position.

BRIEF DESCRIPTION OF THE DRAWINGS

In the drawings which form part of the description of an illustrative, preferred embodiment of the present invention that follows, and wherein like reference numbers refer to like structural elements.

DESCRIPTION OF THE PREFERRED EMBODIMENT

Figures 1, 2:
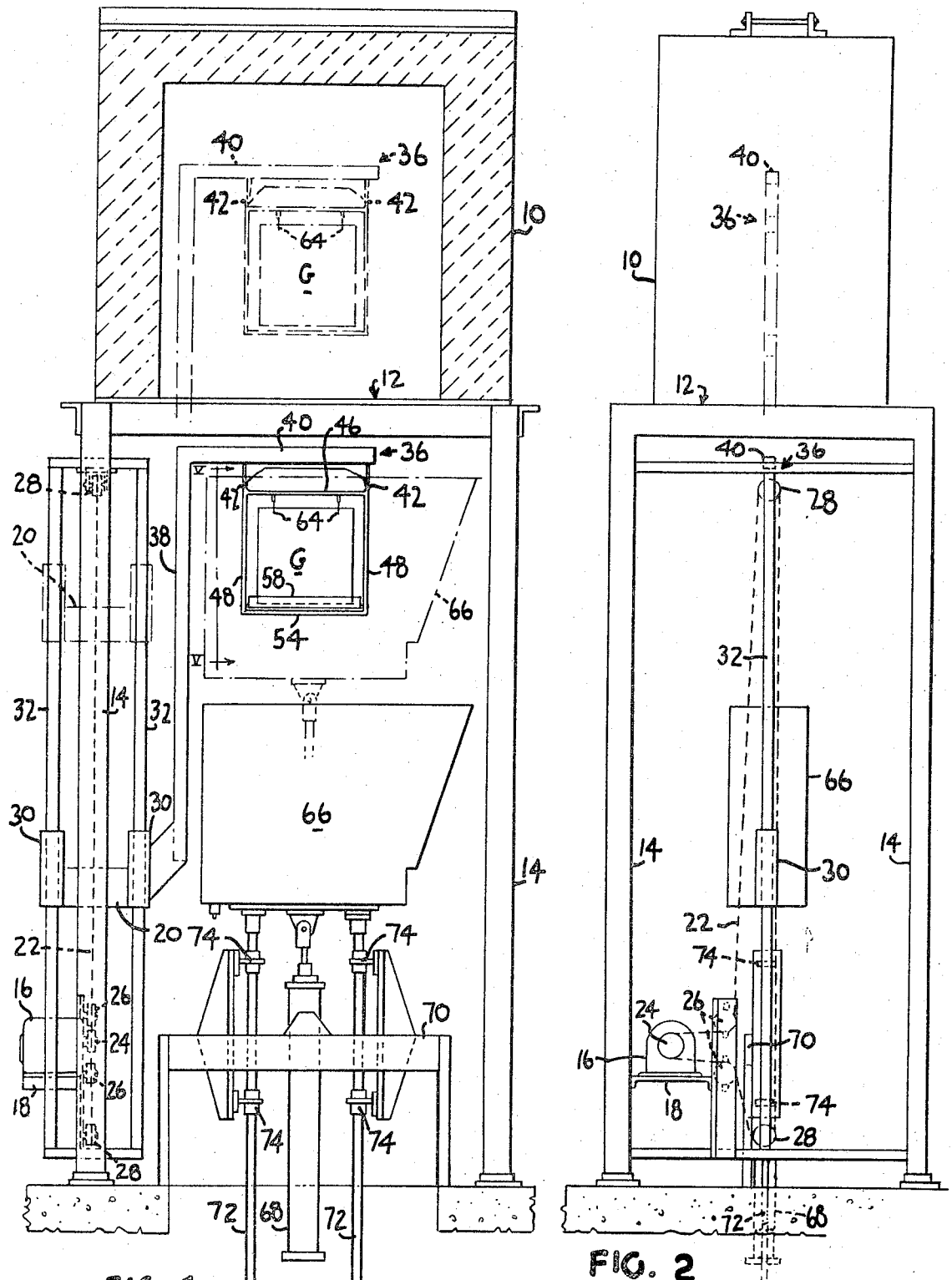
FIG. 1 is an assembly view of apparatus of tempering a glass sheet by quenching susceptible for use of the present invention with certain structural details omitted for the sake of clarity.
FIG. 2 is an end view of the assembly depicted in FIG. 1, omitting certain parts to show other parts more clearly.

Referring to the drawings, the apparatus comprises a conventional heating furnace 10 having conventional heating elements (not shown). The furnace is supported on an open horizontal frame structure 12, which in turn rests on vertical columns 14. The furnace is provided with a slot opening at its bottom.

A reversible motor 16 is supported on a platform 18 to drive an elevator mechanism 20 through a chain drive 22. The latter is driven by a drive sprocket 24 on the main shaft of the motor 16 through adjustable tension sprockets 26 and upper and lower chain sprockets 28. The elevator mechanism 20 is rigidly connected to the chain drive 22 for movement between a lower position depicted in full line in FIG. 1 and an upper position shown in phantom in FIG. 1.

The elevator mechanism 20 includes a cross bar interconnecting vertical sleeves 30 slidably mounted on a pair of vertical guide posts 32 to insure that the elevator mechanism and its attached structure to be described below move in the desired direction of movement required for quenching.

A glass sheet supporting means 36 is connected to the elevator mechanism 20 through a cantilever connection 38. The glass sheet support means 36 comprises a reinforced horizontal bar 40 extending from the cantilever connection 38 and a pair of vertical members 42 that interconnect the horizontal bar 40 with a vertical frame 44.

The vertical frame 44 comprises an upper horizontal frame member 46 to which are attached a pair of vertical end frame members 48, the upper ends of which are rigidly attached to the vertical members 42. The lower end of each vertical end frame member is vertically slotted for attachment to an apertured cross member 50. Nuts and bolts 52 extend through the vertical slots to secure the apertured cross member to each of the vertical walls. A lower horizontal frame member 54 extends in a horizontal direction between the apertured cross members 50 and is provided with longitudinally extending lips 55 that serve as stops. Lower horizontal frame member 54 is secured to cross members 50 to provide a bottom closure for the vertical frame 44. The frame members 46, 48, 48 and 54 are each about two inches wide to provide a frame two inches wide facing the edge of a supported glass sheet.

In a position slightly above about ¼ inch to ½ inch and laterally inward of the lateral sides of the lower horizontal frame member 54, by approximately the same distance horizontally, the vertical end frame members 48 support a pair of pivot rods 56. Each pivot rod 56 is welded to one side edge of a pivotable baffle member 58 along substantially its entire length. Each pivotable baffle member is a mirror image of the other and is about two inches wide and comprises a main portion 60 extending substantially the entire distance between the vertical end frame members 48. Longitudinal end portions 62 extend inward from the longitudinal ends of the main portion 60. The width of the pivotable baffle members is such that in the closed position depicted in FIGS. 4 and 5, their free upper edges are located in a horizontal plane a slight distance (for example, about one inch) above the bottom edge 72 of a glass sheet G that is supported by the apparatus.

The lips 55 serve as stops to limit the orientation of the pivotable baffle members 58 to an oblique angle of about 30 degrees downward and outward from the horizontal. The end portions 62 engage the lower horizontal frame member 54 to provide a stop when their included baffle member 58 pivots about five degrees downward from the vertical.

In order to support a glass sheet in an upright position, the upper horizontal frame member 46 is used to support a pairs of tongs 64 which engage the glass sheet G adjacent its upper edge. The dimensions of the upper horizontal frame member 46, the vertical end frame members 48 and the lower frame member 54 are so chosen as to provide a box-like structure having open ends that are sufficiently larger than the glass sheet to be treated to encompass the glass sheet in a space about one to two inches wide between the flame 44 and the glass sheet G.

The apparatus also comprises a tank 66 for supporting a quenching liquid. The tank 66 is connected to a piston 68 mounted on a platform 70 and is also connected to vertical guide rods 72 slidably received in sleeves 74 to permit the tank 66 to move vertically between a lower position shown in solid lines in FIG. 1 to permit a glass sheet G to be loaded or unloaded and an upper position shown in phantom in FIG. 1 wherein the tank is directly below the furnace so that a glass sheet heated to a temperature sufficient for tempering within the furnace moves a minimum distance from the furnace 10 to the tank 66 after it is heated preparatory for its liquid quenching.

Figure 5:
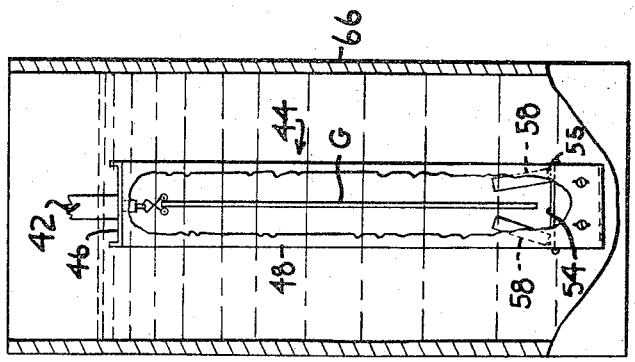
FIGS. 3, 4, and 5 are detailed elevational views of a glass supporting member showing how pivotable baffle means operate to protect the leading edge of a glass sheet from too rapid cooling as the latter enters a liquid quenching medium.
Figure 4:
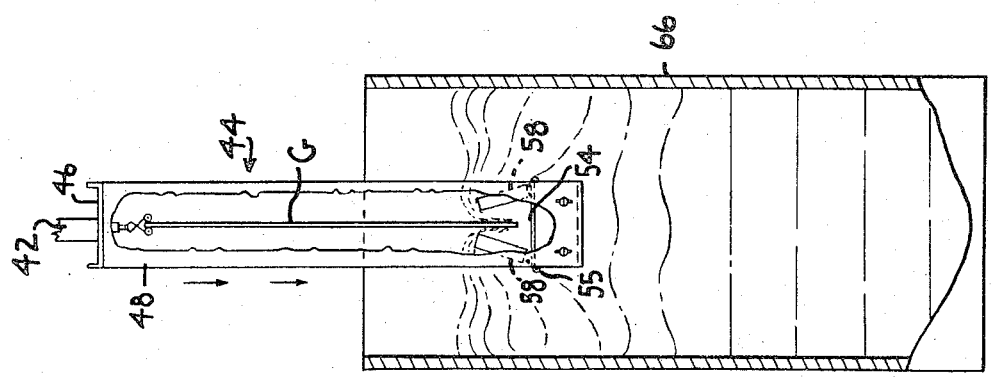
Figure 3:
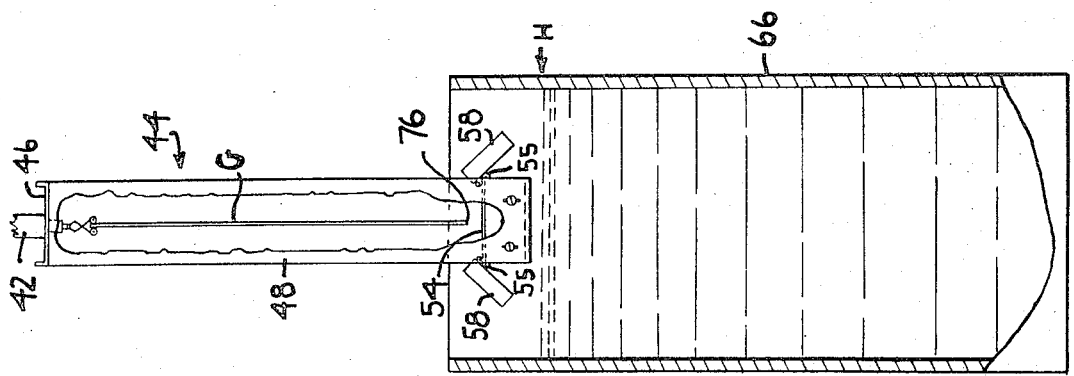
Figure 6:
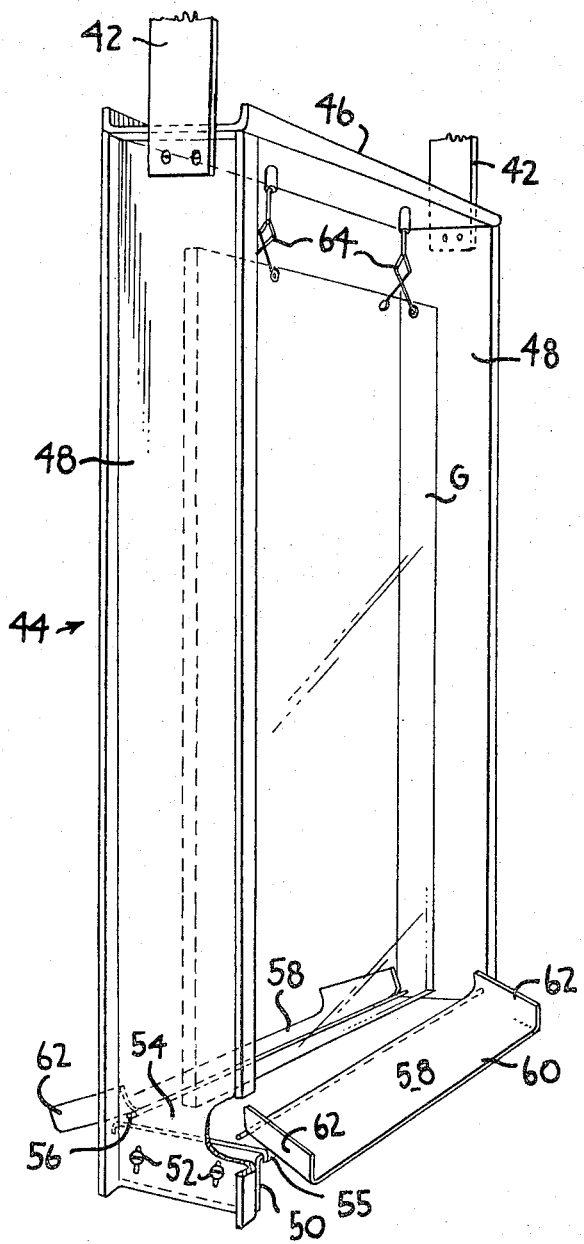
FIG. 6 is a perspective view of the glass support apparatus with parts broken away to show other parts in greater detail.

The gist of the invention can be understood from a study of FIGS. 3, 4 and 5. FIG. 3 shows the vertical frame 44 about to enter the liquid contained in tank 66. The pivotable baffle members 58 are shown pivoted in their recessed position extending outward and downward away from the bottom edge of the glass sheet as defined by the lips 55. The baffle members 58 occupied these recessed positions in the furnace so that the glass sheet G could be heated uniformly over its entire extent with minimum interference with the flow of radiant heat toward the glass sheet. The orientation of the baffle members 58 is so chosen that their main portions 60 lie in an oblique plane that is only a small angle from the horizontal, preferably no more than 30 degrees.

FIG. 4 shows the position of the pivotable baffle members shortly after the vertical frame 44 and its supported glass sheet G has moved down past the horizontal plane H occupied by the upper surface of the liquid in the tank 66. The buoyancy of the liquid has caused the pivotable baffle members 58 to pivot from their recessed positions defined by the engagement of the main portion 60 against the lips 55 extending along the opposite side edges of the lower horizontal frame member 54 to a closed position wherein the lower ends of the longitudinally inturned end portions 62 rest on the upper surfaces of the lower frame member 54.

Pivoting of the baffle members 58 protects the leading edge 76 of the glass sheet G from making initial contact with the liquid within the tank 66 before a portion of the glass sheet inward of the edge has been cooled. Instead, the baffle members 58, by pivoting upward and inward in response to the buoyant force of the liquid within the tank 66, cause the quenching liquid to flow up and over the main portion 60 of each baffle member 58 and to make initial contact with the glass sheet G along a horizontal line spaced upward from the leading or bottom edge 76. The liquid flows downward toward the leading edge and eventually, as shown in FIG. 5, completely fills the space between the leading edge 76 of the glass sheet and the lower horizontal frame member 54. This delay in exposing the leading edge 76 of the glass sheet G enables the leading edge to develop a compression stress before it is subjected to the fracturing stresses caused by the sudden chilling of the leading edge coming into contact with the cold quenching liquid.

Simultaneously, a minor amount of flow of tempering liquid seeps through a thin space between the pivotable baffles 58 and the lower frame member 54. This flow is insufficient to cause the liquid to contact the leading edge 76, yet avoids establishing a pressurized vapor barrier that would impair edge cooling altogether if the apparatus did not leak slightly. The space between the baffles 58 and the lower frame member 54 is preferably less than half the space between the lower glass edge 76 and frame member 54.

In a typical operation, piston 68 is retracted to lower the tank 66 into a lower position and motor 16 is run in a direct to lower the elevator mechanism 20 to position the frame 44 between the furnace 10 and the tank 66 so that an operator may load a glass sheet G by engaging the upper end of the glass sheet with tongs 64. The baffles 58 are pivoted to their recessed positions. It is understood that while the drawings show two sets of tongs gripping the glass, that any number may be used depending upon the mass of glass sheet to be supported. The tongs are generally of the self-closing type well known in the art and are preferably provided with glass engaging members at their lower end in the form of vertical discs or rings of the type invented by Lowell L. Sperry.

After the glass is loaded in the tongs, the elevator mechanism is raised to place the glass sheet and its supporting frame 44 in the furnace 10, with the pivotable baffle members maintaining their recessed position extending outward and downward as depicted in FIG. 3.

While the glass is being heated in the furnace, the piston 68 extends to raise the tank 66 to a position immediately below the furnace such as depicted in phantom lines in FIG. 1. It is noted that the cantilever connector 38 is constructed and arranged to permit its movement into and out of the furnace 10 with the glass sheet encompassing frame 44 without interfering with vertical movement of the tank 66.

When the glass sheet has been heated to a temperature of approximately 1250° F., motor 16 is actuated to lower the elevator mechanism 20 and the frame 44 until the glass sheet G is totally immersed in the bath contained in the tank 66. The latter is still supported in its upper position during the transfer of the glass sheet from the furnace. During the course of lowering the vertical frame 44 and before the leading edge 76 of the glass sheet crosses the plane H occupied by the upper surface of the bath within tank 66, the baffle members 58 pivot upward and inward in response to the buoyant force provided by the liquid within the tank. Thus, the liquid is inhibited from coming into direct contact with the glass sheet G, particularly within the vicinity of its leading edge 76.

The dimensions of the elements of the frame are so chosen that the leading edge 76 of the glass sheet is supported about one inch above the lower horizontal frame member 54 and the pivotable baffle members 58 are spot welded to the pivot rods 56 and extend upward from the piston rod approximately two inches. The piston rods are located approximately 1/4 inch to 1/2 inch above the lower frame member 54 and approximately 1/4 inch inside the vertical edges of the vertical end walls 48.

Thus, as the baffle members pivot, they form a leaky channel member that encompasses the leading edge portion 76 of the glass sheet along a marginal portion approximately one inch wide. As the frame 44 continues to enter the tank, the liquid flows up the walls of the baffles 58 and spills over to contact the glass sheet above its lower edge. This initial contact causes the edge 76 to undergo a compression stress, thus preventing edge breakage and protecting the interior of the sheet as depicted in FIG. 4. Further immersion causes the liquid to contact the leading edge 76 when the latter is in compression stress. By the time the sheet reaches the position shown in FIG. 5, the entire sheet has been contacted with the tempering liquid.

The frame is made of a metal that can withstand the temperature of the furnace and one that does not react with the liquid quenching medium contained within the bath 66. Stainless steel has been used successfully for the frame and other appurtenant apparatus.

In conducting the method of thermally tempering glass using the apparatus of the present invention, a flat-glass sheet is first heated to a very high temperature, substantially above its strain point, but below its softening point. Softening point, as used herein, is that condition in which glass has a viscosity of $10^{7.6}$ poises. The temperature of the glass at its softening point will vary depending on the particular composition of the glass. For example, soda-lime-silica glass has a temperature at its softening point of about 1400° F. and boro-silica glass has a temperature at its softening point of about 1500° F. The strain point of the glass as used herein is that condition in which the glass has a viscosity of $10^{14.6}$ poises. The temperature of the glass at its strain point is also dependent on the glass composition with soda-lime-silica glass having a temperature of about 960° F. at its strain point. Above the softening point, glass behaves as a liquid and below the strain point, glass behaves as a solid. Between the softening point and the strain point, the glass can be considered to behave as a viscoelastic material and its behavior is particularly susceptible to changes in temperature. Sttresses are developed and relieved as the glass is cooled down through these points. If the cooling is rapid enough, the glass surfaces solidify and contract, being put temporarily in tension. However, since the glass core has not cooled to the extent the surfaces have and is still relatively mobile, it can relieve the surface tension by flowing and going temporarily into compression. By the time the core has solidified, its contraction is resisted by the already solid surface layers, which are now put into compression, while the core itself is put into tension.

The stress distribution across the thickness of thermally tempered glass is characteristically parabolic. Typically, the regions of the glass near the surfaces to a depth of about 2/5 of the total thickness (1/5 in each surface) are in compression with a maximum value of the compressive stress at the surface of about 40,000 pounds per square inch. To balance this surface compression, the interior 3/5 of the glass thickness is in tension, the maximum tension at the center of the glass thickness having a value of about one-half the maximum surface compression.

After the glass sheet has been heated to the above-defined temperature, the marginal edges are preliminarily strengthened before the glass is subjected to subsequent liquid quenching. This preliminary strengthening is accomplished by cooling the body of the glass adjacent to but spaced from the marginal edge at a rate at least as great as, preferably greater than, the rate at which the edge is cooled. This differential cooling as explained above results in the body of the glass being temporarily put in tension and the adjacent edges being temporarily put in compression. An edge prestressed in compression is better able to withstand the severe shock of subsequent liquid quenching than is an edge not so prestressed.

The criterion for the liquid quenchant used in the liquid quenching is that it have the capacity to chill the glass rapidly across its entire thickness to a temperature below its strain point, thereby achieving a high degree of temper in the resultant glass sheet.

To meet the above criteria, the chilling liquids must have a certain minimum cooling capacity. A measure of this cooling capacity is the heat transfer coefficient of the liquid. The heat transfer coefficient is defined as the heat exchange at the glass-liquid interface per unit of temperature difference-unit of time-unit of glass surface. For the purposes of this invention, the heat transfer coefficient is expressed as British thermal units/hour-square foot-degree Fahrenheit (B.t.u./hr.-ft.$^2$-° F.). In accordance with this invention, the heat transfer coefficient of the chilling liquids should be at least 150 B.t.u./hr.-ft.$^2$-° F., preferably within the range of 200 to 600 B.t.u./hr.-ft.$^2$-° F. Use of a chilling liquid which has a lower heat transfer coefficient will not set up necessary differential cooling patterns to put the glass edges in compression during the preliminary strengthening or to attain a final high degree of temper during the liquid-quenching step. Using a chilling liquid which has a higher heat transfer coefficient may exert too severe a thermal shock on the glass and as a result, fracturing of the glass in the preliminary strengthening step or in the liquid-quenching step may occur. In thermally tempering thinner glass, i.e., glass of about 0.050 to 0.090 inch in thickness, the chilling liquid should have a heat transfer coefficient in the upper ranges of the above set forth limits. With thin glass, heat exchange between the interior of the glass and the surface is appreciably more rapid than with thicker glass. Therefore, in order to achieve as high a degree of temper in thin glass as is obtainable with thicker glass, the heat transfer coefficient of the chilling liquid should be proportionately greater for thin glass than for thicker glass. With thicker glass, i.e., glass of about 0.100 to 0.500 inch in thickness, a high degree of temper can be obtained using chilling liquids which have a heat transfer coefficient in the lower ranges of the limits set forth.

Examples of chilling liquids which are particularly suitable in the practice of this invention are the oxyalkylene polymers, particularly polyoxyalkylene glycols which are hydroxyl-terminated oxyalkylene polymers. The oxyalkylene polymers can be homopolymers of ethylene oxide, propylene oxide or copolymers of ethylene oxide with one or more additional alkylene oxides, such as propylene oxide, butylene oxide and the like. The oxyalkylene polymers are produced by polymerizing an alkylene oxide or a mixture of alkylene oxides in the presence of a catalyst and a starter. Suitable catalysts are sodium and potassium hydroxides. The starters are compounds which have at least one active hydrogen atom. Suitable starters are water, monohydric alcohols such as methanol, ethanol, propanols, butanols; dihydric alcohols such as ethylene glycol, diethylene glycol, propylene glycol; trihydric alcohols such as glycerine, 1,1,1-trimethylol propane, 1,2,6-hexanetriol; tetrahydric alcohols such as pentaerythritol; hexahydric alcohols such as sorbitol; higher functional alcohols such as dipentaerythritol; monamines such as methylamine, ethylamine, butylamine, aniline and ammonia; polyamines such as ethylenediamine, diethylenetriamine, toluene diamine, mono-polyfunctional amines such as diethanolamine, triisopropanolamine, aniline, dihydric phenols such as hydroquinone, catechol, resorcinol and 2,2-bis(4-hydroxyphenyl)propane. The products of such reaction will be linear or branched oxyalkylene polymers, depending on the functionality of the starter compound. The chains optionally can be terminated with hydroxyl groups. Also, envisioned by this invention is that some or all of these hydroxyl groups may be etherified or esterified.

The preferred oxyalkylene polymers are polyoxyalkylene glycols which are liquids at room temperature and which are water soluble. Oxyalkylene polymers which are solids at room temperature can be used but they must be melted before tempering operations are conducted. Water insoluble polyoxyalkylene polymers can also be used, but necessitate cleaning the glass sheet after tempering with something other than a water rinse. Among the particular types of polyoxyalkylene polymers which can be used in the tempering process of this invention are the following:

Polyoxyethylene glycols,

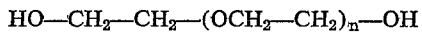

where $n=1$ to 10,000, range at room temperature from water-white liquids to waxy solids. Those above 1000 in molecular weight are sold commercially under the trademark Carbowax. Although pure polyoxyethylene glycols of a specified molecular weight can be prepared and can be used in the practice of this invention, the commercially available compounds are actually mixtures of a number of polyoxyethylene glycol polymers of various molecular weights. The commercially available polyoxyethylene glycols up to a molecular weight of about 700 are water-white liquids at room temperature. Those having molecular weights of 1000 or above are solids that vary in consistency at room temperature from a grease to a hard wax.

Polyoxypropylene glycols,

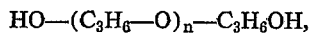

$n=1$ to 10,000 are colorless to light yellow viscous liquids. They are commercially available in molecular weights ranging from approximately 400 to 2000. The low molecular weight polyoxypropylene glycols, i.e., up to a molecular weight of 500, are completely water soluble, while those of higher molecular weight, i.e., from 1000 to 2000 are only slightly soluble in water. Those having an intermediate molecular weight, i.e., from 600 to 900, are moderately soluble in water, about 10 to 20% at room temperature. Polyoxypropylene glycols are commercially available under the trademark Niax.

For the most part, the oxyalkylene polymers, which are used in the practice of this invention, contain both oxyethylene groups and higher oxyalkylene groups such as oxypropylene and oxybutylene groups

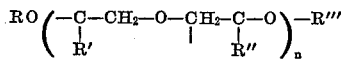

where R, R', R'' and R''' can be selected from H, —CH₃—, C₂H₅, C₃H₇— and C₄H₉, and $n=1$ to 30,000.

The molecular weights of the mixed oxyalkylene polymers useful in the practice of this invention will be about 600 to 400,000, preferably 600 to 40,000. The mixed oxyalkylene polymers have good solubility in water and are generally liquids at ambient temperatures, even in the higher molecular weight ranges where they are very viscous liquids. In the case of copolymers of ethylene oxide with other alkylene oxides, particularly propylene oxide, the oxyalkylene chain can be composed of blocks of oxyethylene groups connected to blocks of, for instance, oxypropylene groups. Also, the oxyalkylene chains may be heteric or random mixtures of oxyethylene and oxypropylene groups. The ratio of oxyethylene or other oxyalkylene groups may vary, for example, from about 50:50 to about 90:10. The amount of oxyethylene groups in a molecule is such that the oxyalkylene polymers are moderately soluble in water at ordinary temperatures and the amount of higher oxyalkylene groups is such that the oxyalkylene polymers remain liquid at ordinary temperatures at higher molecular weights. Mixed polyoxyalkylene glycols are commercially available under the trademark UCON.

Other liquids which can be utilized in the instant process are silicone fluids and hydrocarbon oils.

The silicone fluids of the invention are dialkyl, diaryl or alkyl-aryl fluids. The fluids are linear polymers of alternating silicon and oxygen atoms, each silicon atom having two organic groups attached to it. The chemical formula for the silicone fluids is:

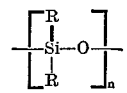

where $n$ varies from 9 to 100, and R is selected from alkyl and/or aryl groups. R can be selected from lower alkyl groups having 1 to 4 carbon atoms. When R is methyl, the above formula depicts the familiar dimethyl silicone fluids. Also R can be selected from aryl groups, especially phenyl groups and alkyl and halo substituted phenyl groups. The incorporation of phenyl groups into the polysiloxane polymer backbone increases the oxidative stability of the fluid. The larger the value of $n$ in the above formula, the higher the molecular weight and the higher the viscosity is in the resulting silicone fluid. In the practice of this invention, silicone fluids having a molecular weight of from about 675 to 11,000 and a viscosity of from about 5 to 200 centistokes at 77° F. are contemplated.

Silicone fluids are sold commercially under the tradenames Dow Corning silicone fluids and General Electric SF. Silicone fluids are well known in the art and are described in An Introduction to the Chemistry of the Silicones, 2nd edition, by E. G. Rockow, Wiley, New York 1951.

One method of preparing the silicone fluids useful in the invention is to hydrolyze in an acidic-aqueous medium dialkyl, diaryl and/or alkyl, -aryl dichlorosilanes,

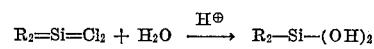

wherein R=alkyl and/or aryl. The silane diol is unstable and self-condenses to a polysiloxane, or what is commonly known as the silicone fluid.

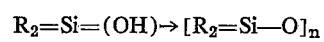

wherein R=alkyl and/or aryl and $n=9$ to about 100.

To prepare low molecular weight or low viscosity products a trialkyl silane such as trimethyl chlorosilane can be added as an end blocker. Thus, for example, if two moles of trimethyl chlorosilane are added for each mole of dimethyldichlorosilane, the following reaction occurs:

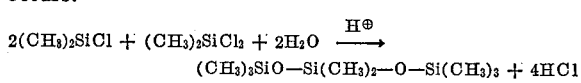

Reduction of the amount of trialkyl silane allows, of course, the formation of higher molecular weight compounds. This end blocking technique is an effective way to control viscosity and also serves to stabilize the viscosity of the silicone fluid against further polymerization upon standing.

The hydrocarbon oils useful in the practice of this invention are the so-called heat treating oils which are well known in the art of metal tempering. Such oils are mineral oils which are obtained from coking operations or petroleum refining. The oils are characterized in that they have low volatility, have resistance to high-temperature, have resistance to oxidation, and have a high flash point. More specifically, the mineral oils useful in the practice of this invention should have a boiling range from about 400° to 800° F.; a flash point from above about 300° to 500° F. and a SUS viscosity within the range of from about 100 to 2500 seconds at 100° F. If the mineral oils used are petroleum derivatives, they may be paraffinic base aromatic base, i.e., naphthenic or mixed base oils. Present in the mineral oil, of course, can be various additives such as anti-oxidants, emulsifiers, thermal stabilizers, viscosity modifiers, surfactants and the like. Such mineral oils are well known in the art of metal tempering and are further described in detail in Metalworking Lubricants; Their Selection, Application and Maintenance, by E. L. Bastian, McGraw-Hill, New York, 1951, and Lubricants and Cutting Oils for Machine Tools by W. G. Forbes, Wiley, New York, 1943.

The liquid-quenching mediums of this invention should be essentially water free. By essentially water free is meant that the quenching medium contain less than 5 percent by weight water. If greater amounts of water are present, there will be an increased tendency for the glass sheet to fracture during the tempering operations. This problem is particularly serious with thinner glass sheets, i.e., sheets having a thickness of about 0.050 to 0.090 inch.

The liquid-quenching media of the instant invention can contain various additives, such as viscosity modifiers, suspension and emulsion stabilizers, wetting agents, detergents, anti-oxidants and thermal stabilizers. Examples of such additives include carboxy methyl cellulose, sodium alkyl sulfonate, sodium dioctyl sulfosuccinate and tert-butyl catechol.

The various liquid-quenching fluids may be utilized alone or may be blended with one or more liquids to provide the liquid-quenching fluid to be employed.

The glass which is tempered according to this invention is typically a silicate-type of flat glass, particularly soda-lime-silicate glass, lead-silicate glass and borosilicate glass. The nature and production of silicate glasses is well known in the art, and generally is described in the Encyclopedia of Chemical Technology, by Kirk-Othmer, published by Interscience Encyclopedia Inc., New York, N.Y., volume 7, pages 181–189. The invention has been found to be particularly useful in the tempering of thinner glass sheets, i.e., glass sheets having a thickness of about 0.050 to 0.125 inch. The invention is generally applicable to tempering glass sheets of from 0.050 to 1 inch or more in thickness.

The geometric configuration of the glass treated in accordance with this invention is not particularly critical in that flat-glass sheets and curved-glass sheets, for example, curved-glass windshields may be tempered using the quenching fluids hereinabove described. The process using the apparatus of the present invention may be readily adapted to either a continuous or a semi-continuous operation to produce resultant tempered glass sheets having an abraded resistance to fracture by stress of the order of 10,000 to 40,000 pounds per square inch and a central tensile stress of the order of 5,000 to 20,000 pounds per square inch.

The dip-quenching apparatus of the present invention offers a simple, convenient, one-step approach to the concept of preliminarily cooling the body of the glass to put the leading edge in compression. Using the dip-quenching apparatus allows one to forego the necessity of having to pass the glass through a preliminary cooling zone to precool the glass sheet interior of its leading edge. Also, the dip-quenching apparatus allows the dip-quenching bath to be utilized for both providing a compressive stress in the leading edge and final cooling. However, the invention should not be limited to the particular quenching apparatus disclosed. Once this invention has been disclosed and understood, those skilled in the art will be able to practice the invention with numerous quenching apparatus of which the dip-quenching apparatus is only one variety.

I claim:

1. Apparatus for supporting a glass sheet for liquid quenching comprising:
    (a) a frame having dimensions larger than said glass sheet and adapted to face the marginal edge of said glass sheet,
    (b) glass engaging means carried by said apparatus for supporting said glass sheet in spaced relation within said frame and in alignment therewith,
    (c) baffle means movably supported with respect to said frame for movement between a recessed position spaced from said supported sheet and a closed position in facing relation to the major surfaces of said supported sheet adjacent a leading edge thereof, said baffle means being responsive to a buoyant force to move from said recessed position to said closed position when said apparatus enters a bath of quenching liquid.

2. Apparatus as in claim 1, wherein said baffle means comprises a pair of baffles, a pivot rod for pivotally supporting each of said baffles with respect to said frame, stop means engageable by each said baffle to support said baffle in one orientation defining said recessed position, and additional stop means engageable by each said baffle in a second orientation to define said closed position.

3. Apparatus for supporting a glass sheet for liquid quenching as in claim 2, wherein said frame comprises an upper horizontal frame member, a lower horizontal frame member and a pair of vertical end members interconnecting the opposed end portions of said upper and lower horizontal frame members,
    said glass engaging means comprises one or more sets of tongs from which said glass sheet is suspended vertically with its lower edge spaced above said lower horizontal frame member,
    and said baffles in the closed position extend upward beyond the lower edge of said supported glass sheet from a plane below the plane occupied by said lower edge to direct the flow of quenching liquid in the bath away from said lower edge temporarily.

4. Apparatus as in claim 3, wherein each said pivotable baffle member has an inner end spaced from said lower horizontal frame member a distance less than half the spacing between said lower edge of said supported glass sheet and said lower horizontal frame member.

5. Apparatus for tempering glass comprising furnace means to heat a glass sheet to a temperature sufficient for tempering,
    a tank containing tempering liquid located below said furnace means,
    glass support means comprising:
        (a) a frame having dimensions larger than said glass sheet and adapted to face the marginal edge of said glass sheet,
        (b) glass engaging means carried by said apparatus for supporting said glass sheet in spaced relation within said frame and in alignment therewith,
        (c) baffle means movably supported with respect to said frame for movement between a recessed position spaced from said supported sheet and a closed position in facing relation to the major surfaces of said supported sheet adjacent a leading edge thereof, said baffle means being responsive to a buoyant force to move from said recessed position to said closed position when said apparatus enters a bath of quenching liquid, and elevator means to move said glass sheet between said furnace and said bath while said sheet is supported within said frame.

6. Apparatus as in claim 5, wherein said baffle means comprises a pair of baffles, a pivot rod for pivotally supporting each of said baffles with respect to said frame, stop means engageable by each said baffle to support said baffle in one orientation defining said recessed position, and additional stop means engageable by each said baffle in a second orientation to define said closed position.

7. Apparatus as in claim 6, wherein said frame comprises an upper horizontal frame member, a lower horizontal frame member and a pair of vertical end members interconnecting the opposed end portions of said upper and lower horizontal frame members, said glass engaging means comprises one or more sets of tongs from which said glass sheet is suspended vertically with its lower edge spaced above said lower horizontal frame member, and said baffles in the closed position extend upward beyond the lower edge of said supported glass sheet from a plane below the plane occupied by said lower edge to direct the flow of quenching liquid in the bath away from said lower edge temporarily.

8. Apparatus as in claim 7, wherein each said pivotable baffle member has an inner end spaced from said lower horizontal frame member a distance less than half the spacing between said lower edge of said supported glass sheet and said lower horizontal frame member.

9. Apparatus as in claim 5, further including means coupled to said tank to move said tank between a lower position spaced from said furnace and an upper position adjacent said furnace.

References Cited
UNITED STATES PATENTS

| | | | |
|---|---|---|---|
| 1,959,215 | 5/1934 | Owen | 65—349 X |
| 2,838,788 | 6/1958 | Hartwig | 65—116 X |
| 3,184,299 | 5/1965 | Wartenberg | 65—348 |

ARTHUR D. KELLOGG, Primary Examiner

U.S. Cl. X.R.

65—116